United States Patent
Benisty et al.

(10) Patent No.: US 12,554,658 B2
(45) Date of Patent: Feb. 17, 2026

(54) MULTI-HOST BANDWIDTH MANAGEMENT CONSIDERING EXTERNAL AND INTERNAL TRAFFIC

(71) Applicant: Western Digital Technologies, Inc., San Jose, CA (US)

(72) Inventors: Shay Benisty, Beer Sheva (IL); Amir Segev, Meiter (IL)

(73) Assignee: Sandisk Technologies, Inc., Milpitas, CA (US)

( * ) Notice: Subject to any disclaimer, the term of this patent is extended or adjusted under 35 U.S.C. 154(b) by 90 days.

(21) Appl. No.: 18/363,131

(22) Filed: Aug. 1, 2023

(65) Prior Publication Data

US 2025/0045211 A1 Feb. 6, 2025

(51) Int. Cl.
*G06F 13/16* (2006.01)
*H04L 47/52* (2022.01)
*H04L 47/80* (2022.01)
*H04L 12/70* (2013.01)

(52) U.S. Cl.
CPC .. *G06F 13/1605* (2013.01); *G06F 2213/0026* (2013.01); *H04L 2012/5632* (2013.01); *H04L 47/521* (2013.01); *H04L 47/522* (2013.01); *H04L 47/805* (2013.01)

(58) Field of Classification Search
CPC ......... G06F 13/1605; G06F 2213/0026; H04L 47/521; H04L 47/522; H04L 47/805; H04L 2012/5632
See application file for complete search history.

(56) References Cited

U.S. PATENT DOCUMENTS

| | | | |
|---|---|---|---|
| 8,645,605 B2 | 2/2014 | Subramaniyan et al. | |
| 10,732,895 B2 | 8/2020 | Earhart et al. | |
| 2015/0222561 A1 | 8/2015 | Okuno et al. | |
| 2015/0295750 A1 | 10/2015 | Blanco et al. | |
| 2016/0203027 A1* | 7/2016 | Challa | G06F 9/45558 718/1 |
| 2018/0322913 A1 | 11/2018 | Friedman et al. | |
| 2019/0146684 A1* | 5/2019 | Benisty | G06F 13/4282 711/102 |
| 2020/0089537 A1 | 3/2020 | Bahirat et al. | |
| 2022/0075560 A1* | 3/2022 | Segev | G06F 3/0604 |

(Continued)

OTHER PUBLICATIONS

International Search Report and Written Opinion for Application No. PCT/US2024/030449 dated Sep. 11, 2024.

*Primary Examiner* — Eric T Oberly
(74) *Attorney, Agent, or Firm* — Patterson + Sheridan, LLP (57) ABSTRACT

Instead of using a bandwidth limiter for bandwidth allocation in an SSD, a dummy virtual function (VF) is used to transfer internal operations. A centralized logic such as the bandwidth limiter is incorporated in the device controller. This logic is responsible for controlling the bandwidth between the hosts. The logic is not just responsible for data transfers triggered by the hosts, but also for data transfers triggered by the device in internal operations such as garbage collection. In order to control the traffic trigged by internal operations, a dummy VF is created along with dummy submission queues. The internal operations are queued in the dummy submission queues, while the bandwidth limiter is responsible for the performance rate. Using this approach, bandwidth allocation is balanced between the hosts and SSD.

20 Claims, 7 Drawing Sheets

(56) References Cited

U.S. PATENT DOCUMENTS

| | | | |
|---|---|---|---|
| 2022/0100543 A1* | 3/2022 | Thomas | G06F 9/5027 |
| 2022/0276887 A1 | 9/2022 | Bert | |
| 2022/0326890 A1 | 10/2022 | Jo et al. | |
| 2024/0143376 A1* | 5/2024 | Poornachandran | G06F 9/45558 |

* cited by examiner

MULTI-HOST BANDWIDTH MANAGEMENT CONSIDERING EXTERNAL AND INTERNAL TRAFFIC

BACKGROUND OF THE DISCLOSURE

Field of the Disclosure

Embodiments of the present disclosure generally relate to improving logic for controlling bandwidth allocation in solid state drives (SSDs).

Description of the Related Art

The single root input/output virtualization (SR-IOV) interface is an extension to the PCI Express (PCIe) specification. SR-IOV allows a device, such as a network adapter, to separate access to resources among various PCIe hardware functions. These functions consist of a PCIe Physical Function (PF) and one or more PCIe Virtual Functions (VFs).

The PF is the primary function of the device and advertises the device's SR-IOV capabilities. The PF is associated with the hypervisor parent partition in a virtualized environment. Each VF is associated with the device's PF. A VF shares one or more physical resources of the device, such as a memory and a network port with the PF and other VFs on the device. Each VF is associated with a hypervisor child partition in a virtualized environment.

Each PF and VF is assigned a unique PCI Express Requester ID (RID) that allows an I/O memory management unit (IOMMU) to differentiate between different traffic streams and apply memory and interrupt translations between the PF and VFs. This allows traffic streams to be delivered directly to the appropriate hypervisor parent or child partition. As a result, there are non-privileged data traffic flows from the PF to VF without affecting other VFs.

SR-IOV enables network traffic to bypass the software switch layer of the hypervisor virtualization stack. Since the VF is assigned to a child partition, the network traffic flows directly between the VF and child partition. As a result, the I/O overhead in the software emulation layer is diminished and achieves network performance that is nearly the same performance as in non-virtualized environments.

There is a need in the art for improving bandwidth allocation for VFs in SSDs.

SUMMARY OF THE DISCLOSURE

Instead of using a bandwidth limiter for bandwidth allocation in an SSD, a dummy virtual function (VF) is used to transfer internal operations. A centralized logic such as the bandwidth limiter is incorporated in the device controller. This logic is responsible for controlling the bandwidth between the hosts. The logic is not just responsible for data transfers triggered by the hosts, but also for data transfers triggered by the device in internal operations such as garbage collection. In order to control the traffic trigged by internal operations, a dummy VF is created along with dummy submission queues. The internal operations are queued in the dummy submission queues, while the bandwidth limiter is responsible for the performance rate. Using this approach, bandwidth allocation is balanced between the hosts and SSD.

In one embodiment, a data storage device comprises: a memory device; and a controller coupled to the memory device, wherein the controller is configured to: create a dummy virtual function (VF), wherein the dummy VF has one or more queues; configure a bandwidth limiter, wherein the bandwidth limiter is configured to allocate bandwidth to the dummy VF and one or more other VFs; queue data storage device internal operations in the one or more queues; and control rate of all data traffic from the dummy VF and the one or more other VFs.

In another embodiment, a data storage device comprises: a memory device; and a controller coupled to the memory device, wherein the controller is configured to: allocate performance bandwidth to one or more virtual functions (VFs) associated with read and write commands from one or more host devices; allocate performance bandwidth to a dummy VF associated with internal data storage device operations; determine that the data storage device cannot provide 100 percent performance; and decrease performance of the one or more VFs and the dummy VF proportionally.

In another embodiment, a data storage device comprises: means for storing data; and a controller coupled to the means for storing data, wherein the controller is configured to: allocate performance bandwidth to a first virtual function (VF) and a second VF associated with read and write commands from one or more host devices; allocate performance bandwidth to a dummy VF associated with internal data storage device operations; determine that the first VF has a bandwidth guarantee; determine that the data storage device cannot provide 100 percent performance to the first VF; and decrease performance of the second VF and the dummy VF.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of using a bandwidth limiter for bandwidth allocation in an SSD, a dummy virtual function (VF) is used to transfer internal operations. A centralized logic such as the bandwidth limiter is incorporated in the device controller. This logic is responsible for controlling the bandwidth between the hosts. The logic is not just responsible for data transfers triggered by the hosts, but also for data transfers triggered by the device in internal operations such as garbage collection. In order to control the traffic trigged by internal operations, a dummy VF is created along with dummy submission queues. The internal operations are queued in the dummy submission queues, while the bandwidth limiter is responsible for the performance rate. Using this approach, bandwidth allocation is balanced between the hosts and SSD.

Figure 1:
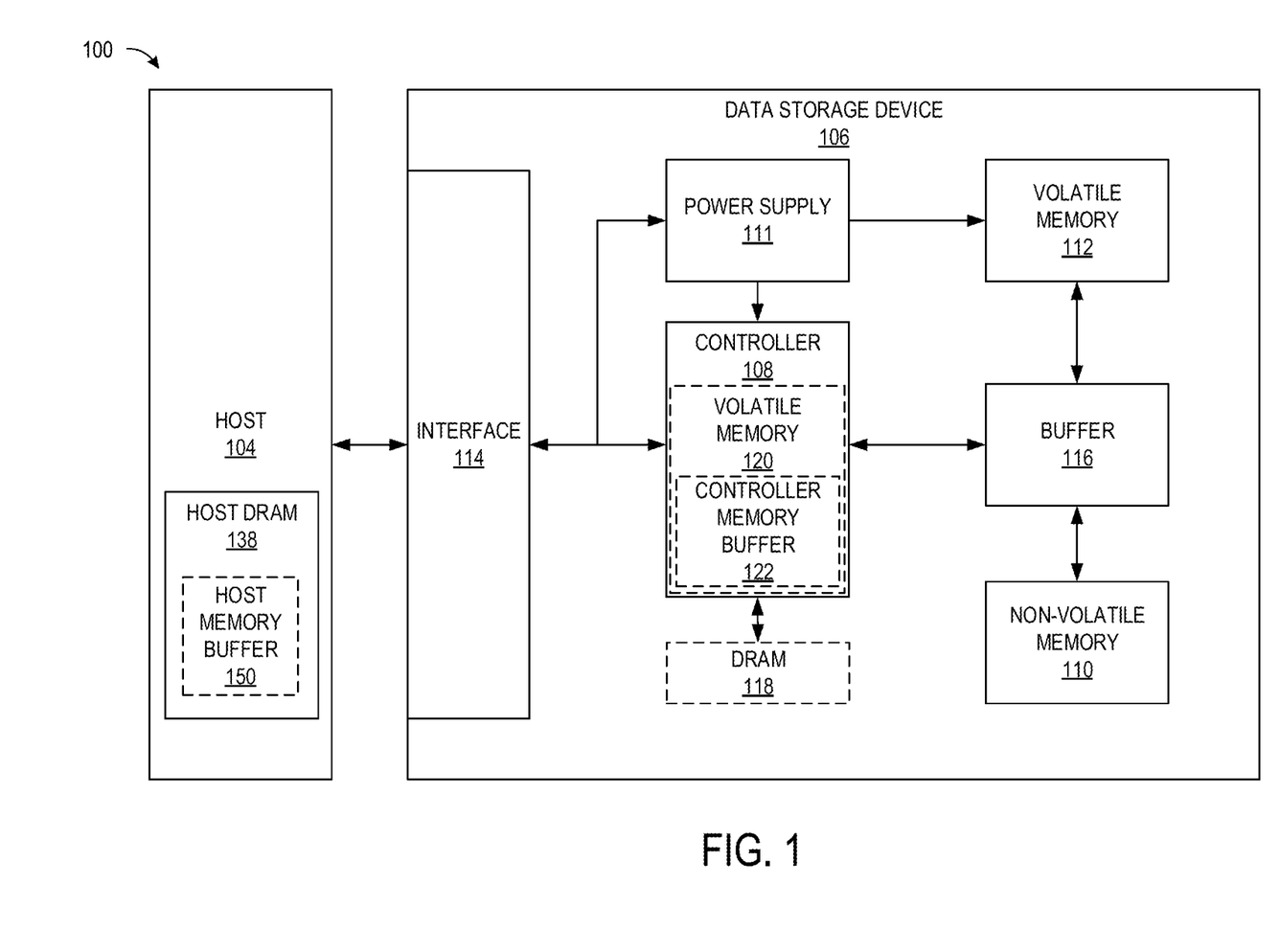
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices. The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
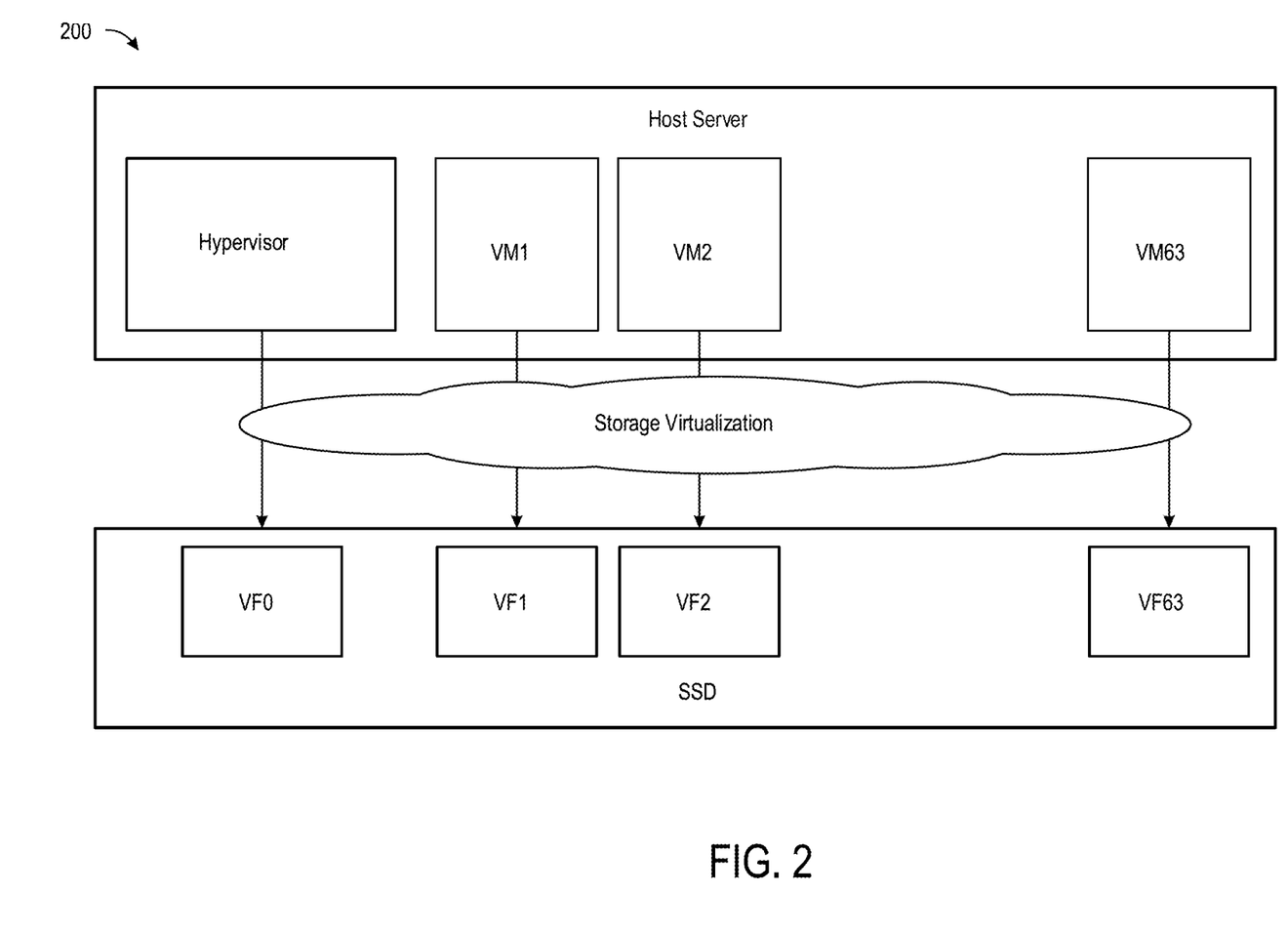
FIG. 2 is a schematic diagram illustrating a system, according to certain embodiments.

FIG. 2 is a schematic diagram illustrating a system 200, according to certain embodiments. The system 200 comprises a host server. In the host server there is a hypervisor and multiple virtual machines (VM). The hypervisor is the manager and is connected to the VF0 (parent) in the SSD. All the other VFs (VF1-VF63) are connected to the corresponding VMs (VM1-VM63) in the host server. The other VFs (VF1-VF63) are also considered as a child.

NVMe virtualization provisions allow up to 100% of the SSD capacity and performance across the VFs. Each VF will have dedicated resources assigned, and the hypervisor can only allocate spare capacity or performance that is not already allocated to other VFs. There are several types of resource types such as, but not limited to capacity resources, queue resources, and performance resources. The capacity resources can be namespace IDs. The queue resources can be NVMe queue and interrupt vectors.

Figure 3:
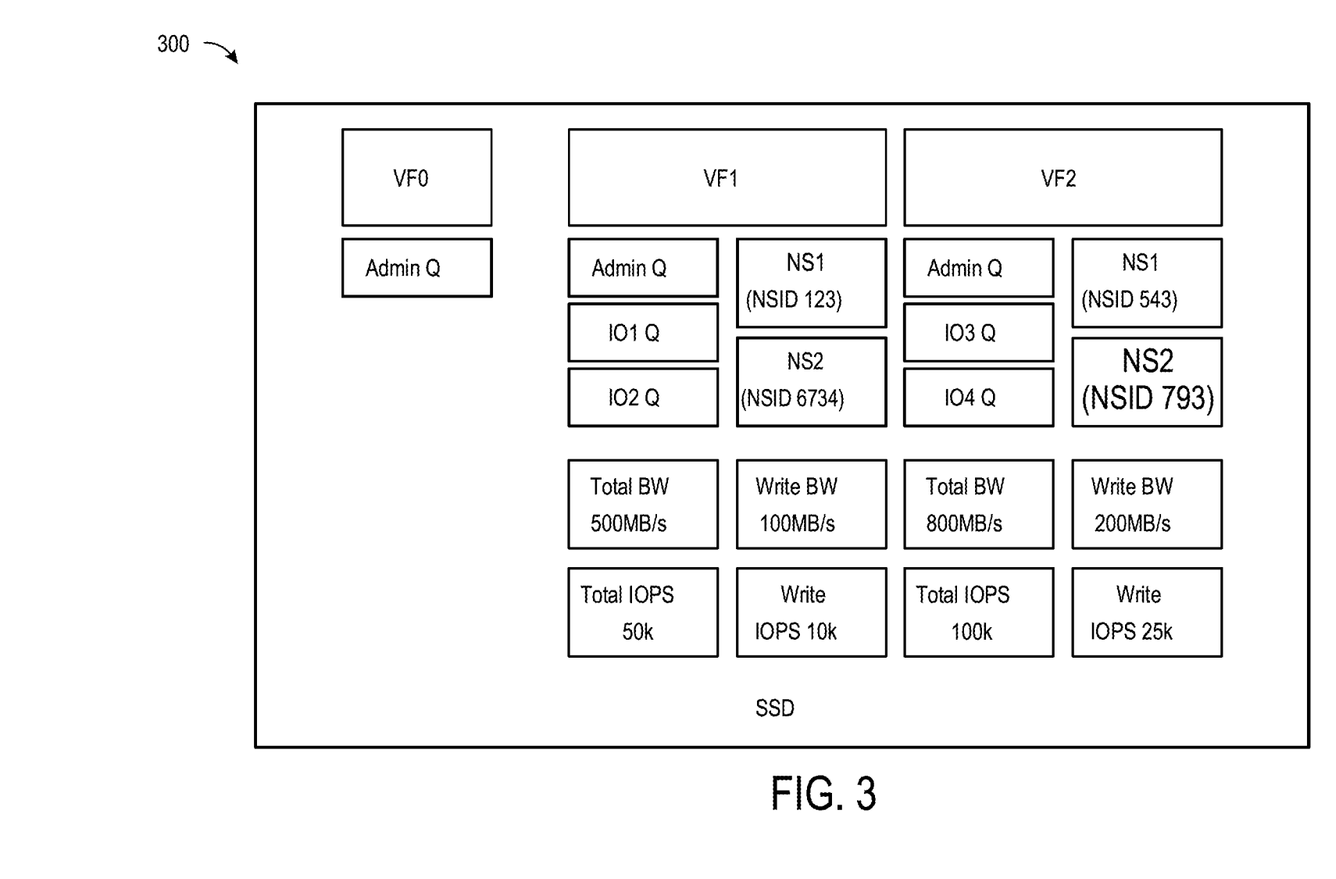
FIG. 3 is a schematic diagram illustrating a virtualized NVMe device, according to certain embodiments.

FIG. 3 is a schematic diagram illustrating a virtualized NVMe device 300, according to certain embodiments. The VF is illustrated with the relevant NVMe queues and namespaces. Each VF has performance resources. The numbers represent the committed performance numbers advertised to the relevant client.

The VF0 (parent) has only an admin queue and no I/O queues because there is no data transfer as part of the VF0, just management. For the other VFs (VF1 and VF2), there are other resource allocations. One of them is the admin queue and several other IO queues. There are namespaces that are allocated to the VF1 and VF2. The VF1 and VF2 each have bandwidth allocation. The bandwidth is allocated for sequential read and writes along with random read and writes. The virtual NVMe device 300 is responsible for the reading requirements of the bandwidths for both the VF1 and VF2. There are several internal operations that run throughout the NVMe device 300 that will take some of the allocated bandwidth. With some of the bandwidth being taken from internal operations such as garbage collection, the bandwidths will need to be balanced.

In the previous approach, a bandwidth limiter block was implemented. The logic may be implemented either in firmware (FW) or in hardware (HW) and optimized for NVMe virtualization. The bandwidth limiter is responsible for the quality of service (QoS) among the various NVMe users. An NVMe user can be a physical submission queue, VF, supported namespace ID or NVMe command stream. The QoS is achieved by controlling the submission queue (SQ) fetching operation. An internal database is implemented in order to keep track of the current bandwidth of each bandwidth limiter vector.

Figure 4:
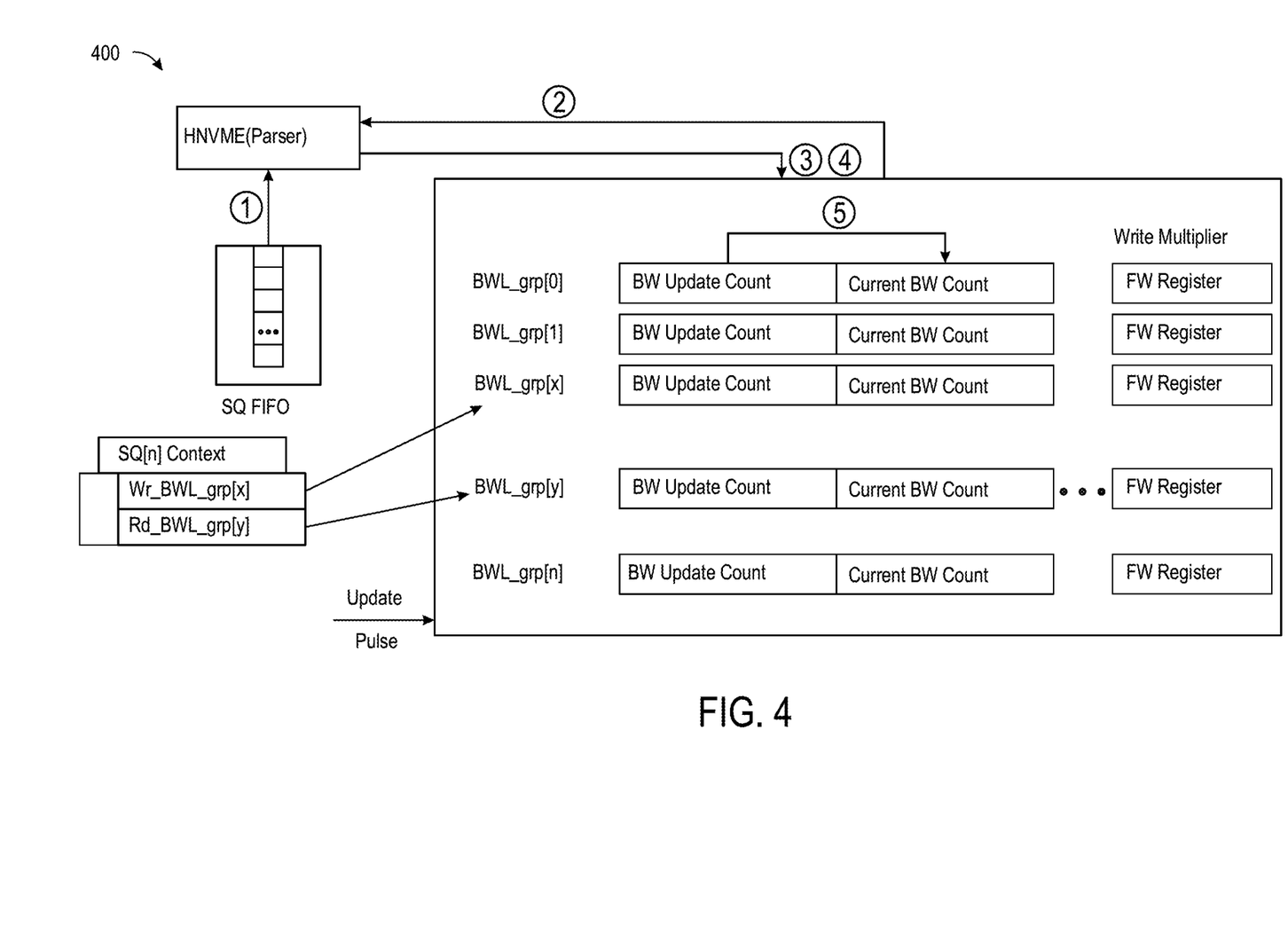
FIG. 4 is a schematic diagram illustrating a bandwidth limiter, according to certain embodiments.

FIG. 4 is a schematic diagram illustrating a bandwidth limiter 400, according to certain embodiments. At the initialization phase, each user (VF) is initialized with the maximum bandwidth allocated for said user. The algorithm makes sure that each user does not exceed the pre-allocated bandwidth by controlling the SQ fetching operation.

Whenever getting a command from the host, the parameter of the command is checked. The controller such as the controller 108 of FIG. 1 determines the amount of bandwidth needed to complete the command. The relevant bandwidth limiter vector and the current bandwidth limiter counter is decremented based on the size of the command. When crossing the low level threshold of the counter, the relevant submission queue ID is disabled for the next fetching operations until the bandwidth allows for fetching to continue.

On a periodic basis, the logic scans the bandwidth limiter groups (FW register and Current BW count) and allocates bandwidth for each one of them. When crossing the high-level threshold of the counter, all previous SQ IDs that were disabled by this particular vector will now be enabled.

The main drawback of this approach is that the bandwidth requirements are managed only towards the host interface and are met only when not having internal operations (such as garbage collection). When adding these operations, a noise is added to the logic. Without taking the noise into account, the device will not be able to control the noise. As will be discussed below, internal SSD operations impact bandwidth and should be taken into account for bandwidth management.

As discussed herein, centralized logic or a bandwidth limiter incorporated into the device controller is beneficial. The logic is responsible for controlling the bandwidth towards the memory device interfaces. The logic is not just responsible for data transfers triggered by a host device, but also for data transfers triggered by the device in SSD internal operations such as garbage collection. In order to control the traffic triggered by internal SSD operations, a dummy PF/NF is created internally along with a few SQs. The internal operations are queued in the dummy SQs while the bandwidth limiter is responsible for the consumption rate. Under such an approach a QoS is improved while considering the internal SSD operations.

Figure 5:
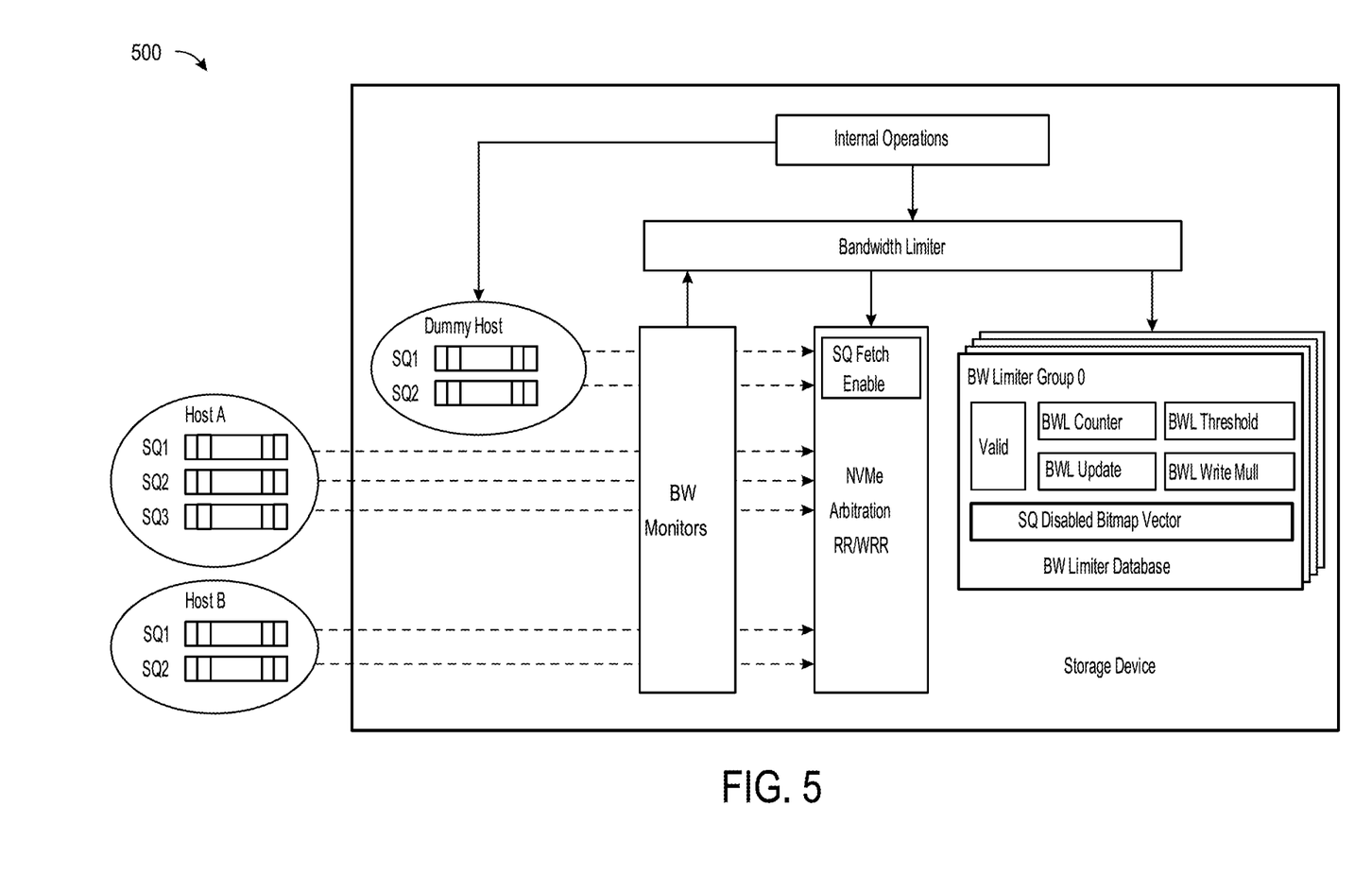
FIG. 5 is a schematic diagram illustrating a bandwidth limiter considering internal operations, according to certain embodiments.

FIG. 5 is a schematic diagram illustrating SSD 500 with a bandwidth limiter considering internal operations, according to certain embodiments. All internal operations that require some bandwidth from the memory device (e.g., NAND) pass through the bandwidth limiter. A dummy VF is created along with the dummy SQs. Those requests are queued in the SQs. The bandwidth limiter controls the bandwidth on the drive considering also internal operations. By using the same technique while the dummy VF mimics the host for all internal operations the bandwidth of VFs can be balanced.

The SSD 500 comprises a bandwidth limiter that considers all internal operations. A bandwidth monitor that monitors the bandwidths of both host A and host B is also present. It should be understood that although this example shows only two external host, more are contemplated. The bandwidth monitor then sends the feedback to the bandwidth limiter. The SSD 500 further comprises a dummy host, an NVME arbitration logic, and a bandwidth limiter database. Both the NVMe arbitration logic and the bandwidth limiter database receive information from the bandwidth limiter. The NVMe arbitration logic comprises a SQ fetch enable. The SQ fetch enable controls the queues and decides when to fetch new commands and when to stop fetching new commands from the device.

The dummy host is a new addition in conjunction with the use of the bandwidth limiter. The dummy host is not visible to the external hosts (host A and Host B). The external hosts do not know that the dummy host exists. Though the added host is a dummy host, the bandwidth limiter database will function as if the dummy host were a regular external host. For example, if the system has 48 hosts the dummy host will be considered the $49^{th}$ host and the logic of the bandwidth limiter database will function as if all 49 hosts are external hosts. This will allow for all internal operations to run through the dummy host. Furthermore, there will be dummy SQs created and all the internal operations will be queued in the same manner as if the dummy host were an external host. The bandwidth limiter and bandwidth monitor will continue this logic with the dummy SQ. At the initialization phase, the FW will be defined and the bandwidth allocated for the dummy host will be defined as well. The benefit of this approach is the use of the bandwidth limiter while being able to control the bandwidth of all the internal operations without limiting the bandwidth from the external hosts.

Each of the external hosts and the dummy host can be configured in one of two modes. The first being a base isolation mode. The base isolation mode is configured as if for any reason in the SSD 500 cannot provide 100% performance, the VFs (child) in base isolation mode have their respective write performance will drop proportionally. The read performance for the VFs (child) may also be dropped proportionally as well. For example, instead of having 100% performance to all of the hosts there will only be 95% performance to all of the hosts. Stated another way, in base isolation mode, when performance cannot be 100%, then all VFs are impacted. In one embodiment, all VFs are impacted in the exact same amount. For example, the total bandwidth decrease is 5% and all VFs are decreased by the exact same amount to achieve a 5% bandwidth reduction. In such a scenario, some VFs would have a larger than 5% reduction while others would have a less than 5% reduction so that collectively a 5% reduction occurs. In another embodiment, all VFs are impacted proportionally based upon an amount of allocated bandwidth. For example, for a 5% reduction, each VF is reduced by 5%.

The second mode is the full isolation mode. The full isolation mode is configured as if for any reason the SSD 500 cannot provide 100% performance, the VFs (child) in full isolation mode will be prioritized so that they may continue to receive their allocated performance. The prioritized VFs (child) will be determined based on the highest need by the SSD 500 at the time of the operation. For example if host A has the highest priority and is allocated 1 GB/sec then, all the VFs (child) associated with host A will continue to use the allocated 1 GB/sec bandwidth that is allocated. Stated another way, if one VF has a guaranteed bandwidth, then when overall performance decreases, the one VF has to maintain the bandwidth guarantee and thus, all other VFs are reduced. The reduction to the remaining VFs can follow the base isolation mode distribution discussed above.

Figure 6:
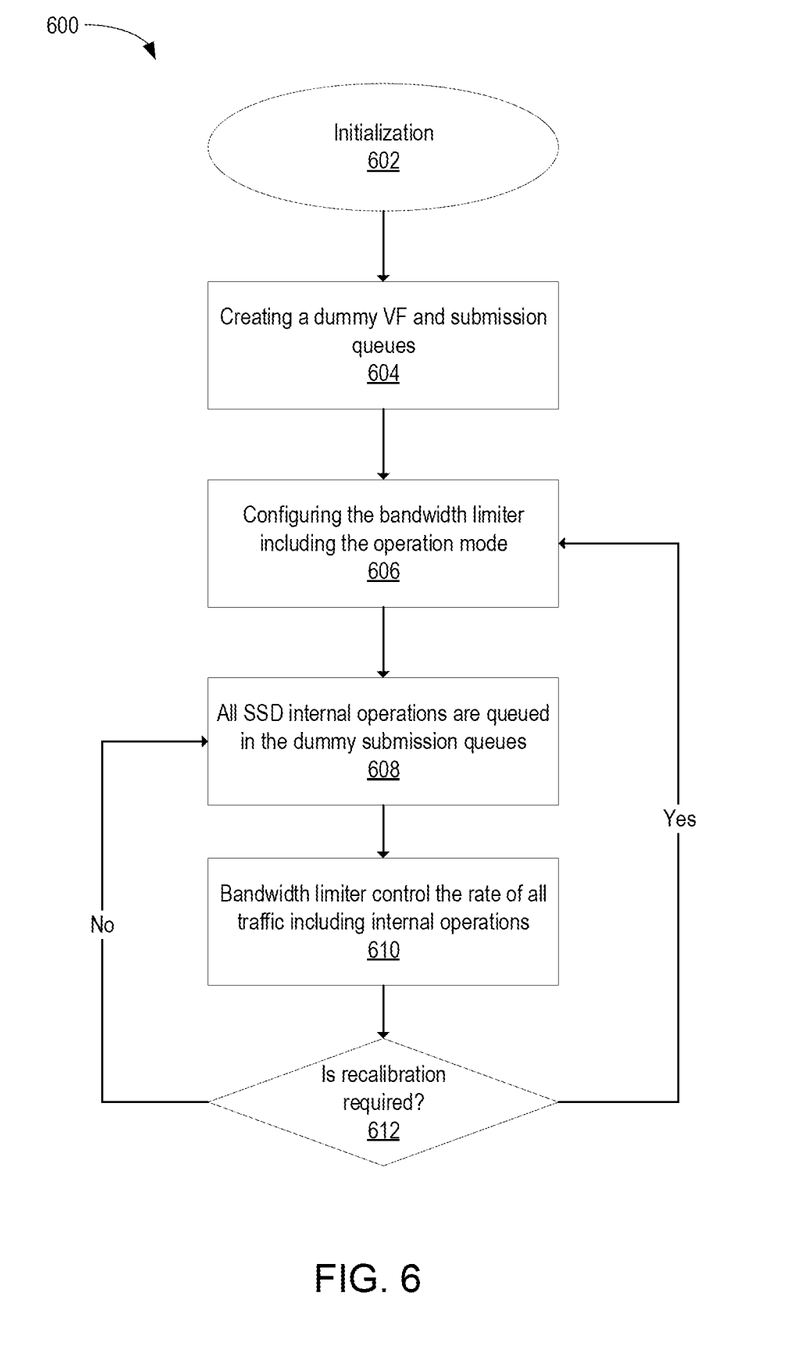
FIG. 6 is a flowchart illustrating a method for a bandwidth limiter considering internal operations, according to certain embodiments.

FIG. 6 is a flowchart illustrating a method 600 for a bandwidth limiter considering internal operations, according to certain embodiments. The bandwidth allocation can be changed dynamically. When extensive background operation is required, the bandwidth allocation to the dummy VF is configured to service those operations only while starving for a short time the other regular VFs which represent host traffic.

The method 600 begins at block 602. At block 602, initialization begins in the SSD, such as the SSD 500 of FIG. 5. At block 604, the controller, such as controller 108 of FIG. 1, creates a dummy VF and dummy SQs. At block 606, the bandwidth limiter, such as the bandwidth limiter of FIG. 5, is configured as is the operation mode. The operation mode can be one of either the base isolation mode or the full isolation mode as described above. At block 608, all internal operations are queued in the dummy SQs. At block 610, the bandwidth limiter controls the rate of all traffic including internal operations. At block 612, the controller determines whether recalibration is required. If the controller determines that recalibration is required then the method 600 returns to block 606. If the controller determines that calibration is not required then the method 600 returns to block 608.

Figure 7:
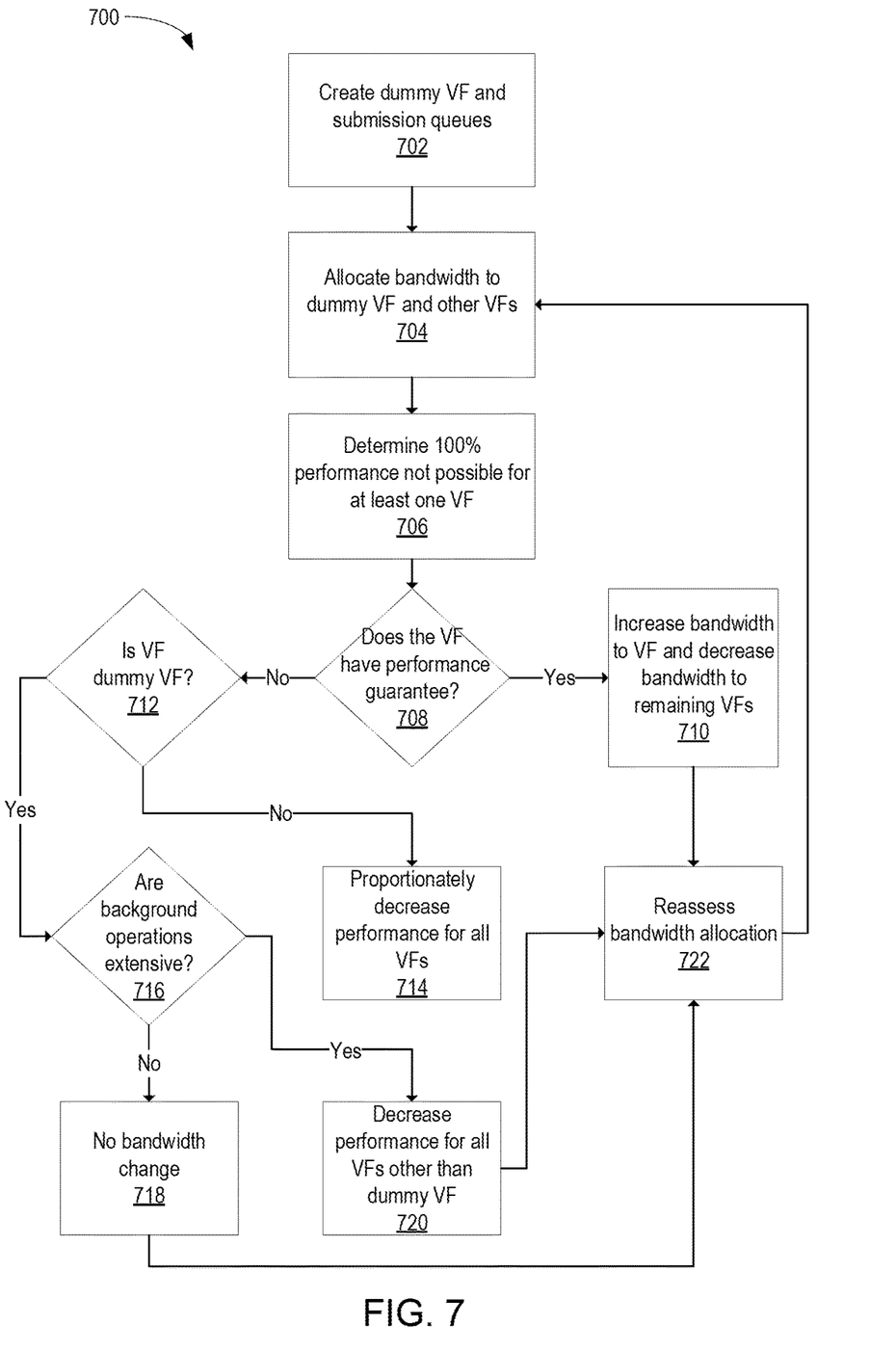
FIG. 7 is a flowchart illustrating a method for a bandwidth limiter considering internal operations and VF performance, according to certain embodiments.

FIG. 7 is a flowchart illustrating a method 700 for a bandwidth limiter considering internal operations and VF performance, according to certain embodiments. The VF performance determines the amount of allocated bandwidth each VF receives.

The method 700 begins at block 702. At block 702, the controller such as the controller 108 of FIG. 1 creates a dummy VF and one or more dummy SQs. At block 704, bandwidth is allocated to the dummy VF and the other VFs. At block 706, the controller determines that 100% is not possible for at least one of the VFs. At block 708, the controller determines whether the VF has a performance guarantee. If the controller determines that the VF has a performance guarantee, then the method 700 proceeds to block 710. If the controller determines that the VF does not have a performance guarantee, then the method 700 proceeds to block 712. At block 710, the bandwidth of the VF is increased while the bandwidth of all other remaining VFs are decreased. At the completion of block 710 the method 700 proceeds to block 722.

At block 712, the controller determines whether the VF is a dummy VF. If the controller determines that the VF is not dummy VF, then the method 700 proceeds to block 714. If the controller determines that the VF is a dummy VF, then the method 700 proceeds to block 716. At block 714, the performance of all VFs will be proportionality decreased. At block 716, the SSD determines whether background operations are extensive. If the controller determines that the background operations are not extensive, then the method 700 proceeds to block 718. If the controller determines that the background operations are extensive, then the method 700 proceeds to block 720. At block 718, there will be no bandwidth change. At the completion of block 718 the method 700 proceeds to block 722. At block 720, the performance of all VFs other than the dummy VF will be decreased. At the completion of block 720 the method 700 proceeds to block 722. At block 772, the controller reassesses the bandwidth allocation of all VFs.

The main advantage of this disclosure can be measured in better QoS results, which are achieved since the logic considers internal operations as part of the bandwidth management.

In one embodiment, a data storage device comprises: a memory device; and a controller coupled to the memory device, wherein the controller is configured to: create a dummy virtual function (VF), wherein the dummy VF has one or more queues; configure a bandwidth limiter, wherein the bandwidth limiter is configured to allocate bandwidth to the dummy VF and one or more other VFs; queue data storage device internal operations in the one or more queues; and control rate of all data traffic from the dummy VF and the one or more other VFs. The dummy VF is configured to control internal data storage device operations. The controller is configured to dynamically adjust bandwidth allocation. The controller is further configured to determine whether recalibration of the allocated bandwidth should occur. The controller is configured to determine that the data storage device is unable to provide 100 percent performance. The controller is configured to decrease performance of the one or more VFs and the dummy VF proportionately in response to the determining. The controller is configured to determine that a first VF of the one or more VFs has a bandwidth guarantee. The controller is configured to decrease performance of a second VF of the one or more VFs while maintaining a performance of the first VF in response to the determining. The controller is controller is configured to decrease performance of the one or more VFs while increasing performance of the dummy VF. The decreasing is in response to a determination that background operations in an amount above a threshold are required. The decreasing is for a predetermined period of time.

In another embodiment, a data storage device comprises: a memory device; and a controller coupled to the memory device, wherein the controller is configured to: allocate performance bandwidth to one or more virtual functions (VFs) associated with read and write commands from one or more host devices; allocate performance bandwidth to a dummy VF associated with internal data storage device operations; determine that the data storage device cannot provide 100 percent performance; and decrease performance of the one or more VFs and the dummy VF proportionally. The dummy VF is invisible to a host device. The dummy VF includes a plurality of submission queues. The controller is configured to queue internal data storage device operation requests in the plurality of submissions queues.

In another embodiment, a data storage device comprises: means for storing data; and a controller coupled to the means for storing data, wherein the controller is configured to: allocate performance bandwidth to a first virtual function (VF) and a second VF associated with read and write commands from one or more host devices; allocate performance bandwidth to a dummy VF associated with internal data storage device operations; determine that the first VF has a bandwidth guarantee; determine that the data storage device cannot provide 100 percent performance to the first VF; and decrease performance of the second VF and the dummy VF. Decreasing performance comprises reducing bandwidth for the second VF and dummy VF. The reducing bandwidth is proportional. The controller is configured to increase bandwidth for the first VF in response to the decreasing. The controller is further configured to recalibrate allocated bandwidth.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
create a dummy virtual function (VF), wherein the dummy VF has one or more queues, wherein the dummy VF is associated with internal operations of the data storage device;
configure a bandwidth limiter, wherein the bandwidth limiter is configured to allocate bandwidth to the dummy VF and one or more other VFs, wherein the one or more other VFs are associated with host traffic;
queue data storage device internal operations in the one or more queues;
determine that the data storage device is unable to provide to the dummy VF 100 percent performance of the bandwidth allocated to the dummy VF;
determine whether internal operations of the data storage device are above a threshold; and
control rate of all data traffic from the dummy VF and the one or more other VFs responsive to determining that the data storage device is unable to provide the dummy VF 100 percent performance of the bandwidth allocated to the dummy VF and that the internal operations of the data storage device are above a threshold, wherein controlling the rate of all data traffic comprises maintaining a bandwidth allocation of the dummy VF while decreasing a bandwidth allocation of the one or more other VFs.

2. The data storage device of claim 1, wherein the dummy VF is configured to control internal data storage device operations.

3. The data storage device of claim 1, wherein the controller is configured to dynamically adjust bandwidth allocation.

4. The data storage device of claim 1, wherein the controller is further configured to determine whether recalibration of the allocated bandwidth should occur.

5. The data storage device of claim 1, wherein the controller is configured to determine that the data storage device is unable to provide to at least one VF of the one or more other VFs 100 percent performance of the bandwidth allocated to the at least one VF.

6. The data storage device of claim 5, wherein the controller is configured to decrease performance of the one or more other VFs and the dummy VF proportionately in response to the determining.

7. The data storage device of claim 5, wherein the controller is configured to determine that the at least one VF of the one or more other VFs has a bandwidth guarantee.

8. The data storage device of claim 7, wherein the controller is configured to decrease performance of the one or more other VFs except for the at least one VFs while maintaining a performance of the at least one VF in response to the determining.

9. The data storage device of claim 1, wherein the controller is controller is configured to decrease performance of the one or more other VFs while increasing performance of the dummy VF.

10. The data storage device of claim 9, wherein the decreasing is in response to a determination that background operations in an amount above a threshold are required.

11. The data storage device of claim 10, wherein the decreasing is for a predetermined period of time.

12. A data storage device, comprising:
a memory device; and
a controller coupled to the memory device, wherein the controller is configured to:
allocate performance bandwidth to one or more virtual functions (VFs) associated with read and write commands from one or more host devices;
allocate performance bandwidth to a dummy VF associated with internal data storage device operations;
determine that the data storage device cannot provide 100 percent performance of the performance bandwidth allocated to the dummy VF;
determine whether internal operations of the data storage device are above a threshold;
decrease the performance bandwidth allocated to the one or more VFs based on determining that internal operations are above the threshold and the data storage device cannot provide 100 percent performance of the performance bandwidth allocated to the dummy VF; and
maintain the performance bandwidth allocated to the dummy VF based on determining that internal operations are above the threshold during the decreasing and the data storage device cannot provide 100 percent performance of the performance bandwidth allocated to the dummy VE.

13. The data storage device of claim 12, wherein the dummy VF is invisible to a host device.

14. The data storage device of claim 12, wherein the dummy VF includes a plurality of submission queues.

15. The data storage device of claim 14, wherein the controller is configured to queue internal data storage device operation requests in the plurality of submissions queues.

16. The data storage device of claim 12, wherein the performance bandwidth allocated to a VF is not decreased if the VF has a performance guarantee.

17. A data storage device, comprising:
means for storing data; and
a controller coupled to the means for storing data, wherein the controller is configured to:
allocate performance bandwidth to a first virtual function (VF) and a second VF associated with read and write commands from one or more host devices;
allocate performance bandwidth to a dummy VF associated with internal data storage device operations;
determine that the data storage device cannot provide 100 percent performance of the performance bandwidth allocated to the dummy VF;
determine whether internal operations of the data storage device are above a threshold;
decrease the performance bandwidth allocated to the first VF and the second VF based on determining that internal operations are above the threshold and the data storage device cannot provide 100 percent performance of the performance bandwidth allocated to the dummy VE; and
maintain the performance bandwidth allocated to the dummy VF during the decreasing based on determining that internal operations are above the threshold and the data storage device cannot provide 100 percent performance of the performance bandwidth allocated to the dummy VF.

18. The data storage device of claim 17, wherein the controller is configured to proportionally decrease the performance bandwidth allocated to the first and second VF.

19. The data storage device of claim 17, wherein the controller is configured to increase the performance bandwidth allocated to the first VF in response to determining that the first VF has a performance guarantee.

20. The data storage device of claim 17, wherein the controller is further configured to recalibrate allocated bandwidth.

* * * * *